Figure 5:
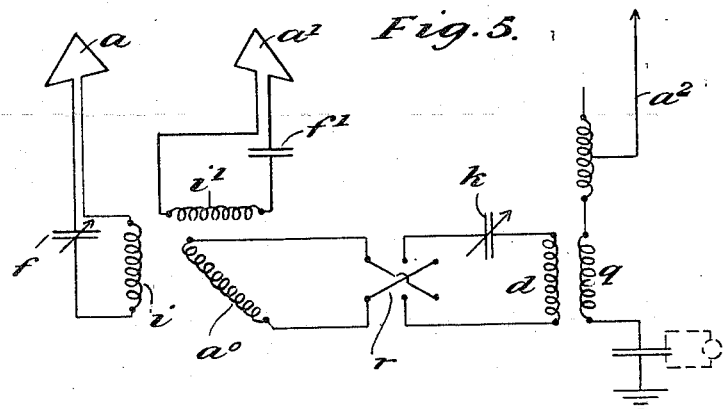

J. ERSKINE-MURRAY AND J. ROBINSON.
ELECTROMAGNETIC WAVE NAVIGATIONAL ARRANGEMENT.
APPLICATION FILED OCT. 29, 1919.
1,379,541.
Patented May 24, 1921.
2 SHEETS—SHEET 1.
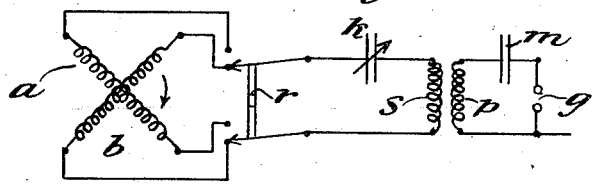
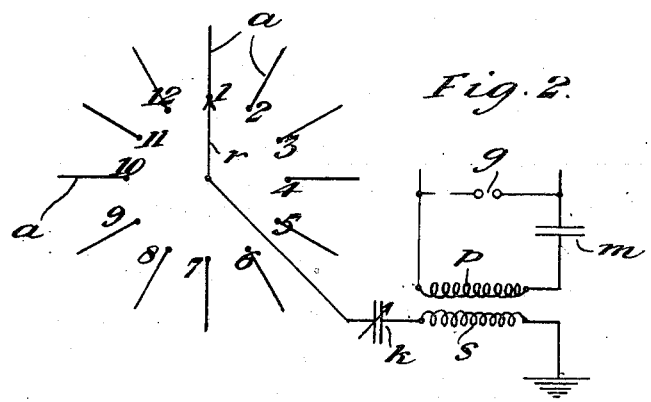
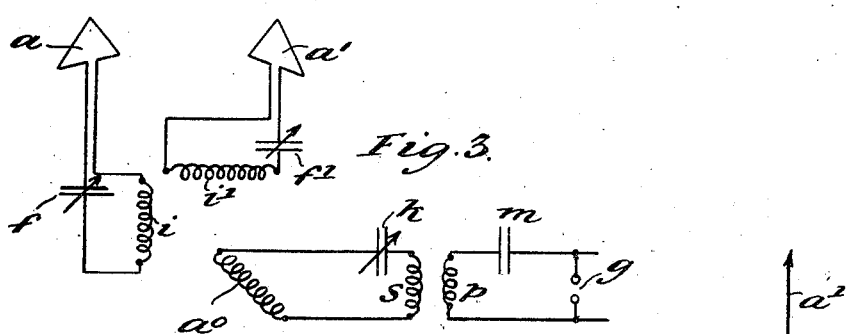
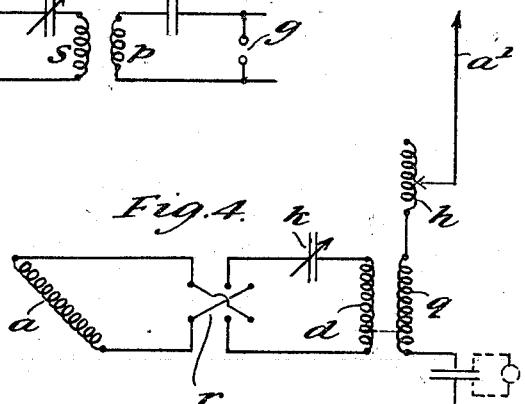

UNITED STATES PATENT OFFICE.

JAMES ERSKINE-MURRAY AND JAMES ROBINSON, OF BIGGIN HILL, ENGLAND.

ELECTROMAGNETIC-WAVE NAVIGATIONAL ARRANGEMENT.

1,379,541.  Specification of Letters Patent.  Patented May 24, 1921.

Application filed October 29, 1919. Serial No. 334,136.

*To all whom it may concern:*

Be it known that we, JAMES ERSKINE-MURRAY and JAMES ROBINSON, both subjects of the King of Great Britain, both residing in Biggin Hill, England, have jointly invented certain new and useful Improvements in Electromagnetic-Wave Navigational Arrangements, of which the following is a specification.

This invention relates to the directive propagation of electromagnetic waves such as those used in wireless telegraphy and telephony, and has for its principal object to provide means whereby any ordinary receiving station may be able to ascertain with accuracy the direction from which electromagnetic waves emanating from a transmitting station, using apparatus in accordance with the present invention, reach such receiving station. It will readily be seen that any vessel at sea or any aircraft fitted with wireless apparatus which brings them within the range of a station or stations equipped as hereinafter described will be able to use the directional information so obtained for any navigational purpose.

According to the invention directive signals are propagated from the source in pairs of quickly succeeding individual signals at small time intervals, the individual signals of each pair being in different directions, not only from each other, as has been previously proposed, but also from the corresponding individual signals of the preceding pair of signals and of the succeeding pair.

The direction of the source can therefore be determined by a receiving station within range when the individual signals of a pair of signals are of equal strength, for in such case the signals emanating from the source will be directed at predetermined angles on either side of the reception point.

In the preferred arrangement according to this invention the pairs of signals are produced, and may be emitted directly, by a pair of coils which are orthogonally arranged and rotatable about their common central axis. The coils are coupled in series with each other by an arrangement which permits the reversal of one of them with respect to the other. It will be seen that if a distinctive signal is sent out from the source when these coils occupy a definite position and the receiving station has means for determining, by timing or otherwise, the angular displacement of the coils from this definite position at the moment when the individual signals of a pair of signals are of equal strength and consequently only one of the coils is effective in producing indications at the receiving station, the direction of the source of the signals can be obtained.

Figure 6:
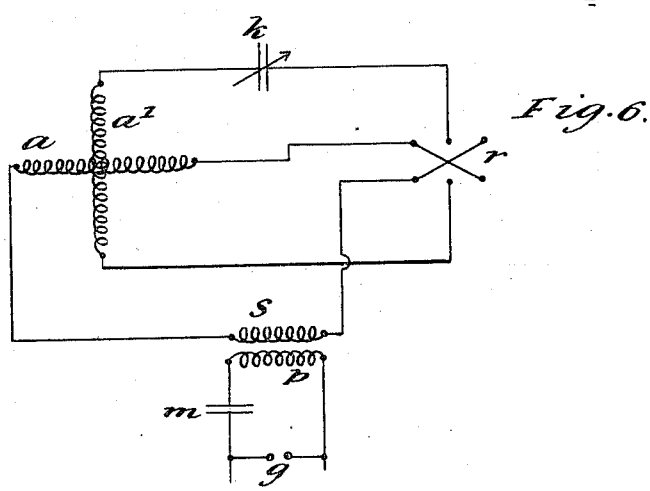
Figure 7:
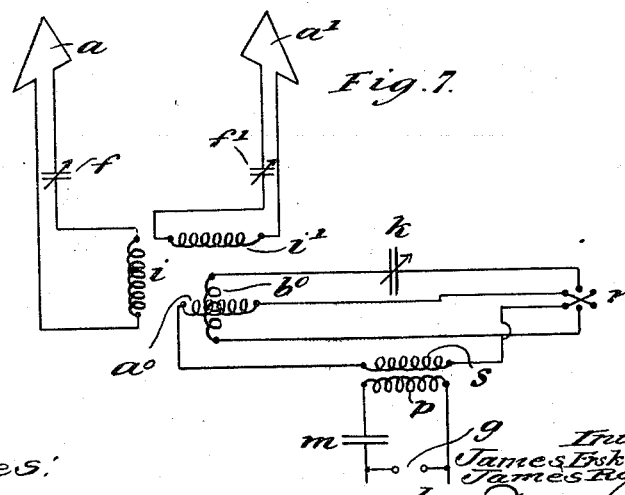

The invention will be hereinafter more particularly described with reference to the accompanying diagrammatic drawings, wherein Figure 1 shows one arrangement of the signal emitting coils; Fig. 2 shows a modification in which these coils are stationary; Fig. 3 shows a further modification in which the signal producing coils are associated with a pair of fixed aerials; Fig. 4 shows an arrangement in which a rotatable or directive aerial is used in conjunction with a fixed aerial; Fig. 5 is a modification of this last arrangement in which the radiating elements are energized by a combination of directive or rotatable coil and a fixed coil; Fig. 6 shows an arrangement in which a pair of aerials at a fixed angle are rotated; and Fig. 7 is a modification of this in which the radiating elements are fixed and are inductively energized by a pair of rotatable coils.

In the arrangement of Fig. 1, the radiating coils $a$, $b$ are at a fixed angle with respect to each other and are rotatable about their common central vertical axis. They are rotated step-by-step or continuously at a definite speed and are alternately energized at each step or at definite time intervals or positions by the operation of switch $r$ which connects the coils $a$, $b$ alternately in a circuit containing a tuning condenser $k$ and inductive coil $s$ through which the circuit is energized by the oscillation circuit containing spark gap $g$, condenser $m$ and primary coil $p$. If distinctive signals are sent out from the source at definite positions of the coils $a$, $b$, corresponding for example to the cardinal points of the compass and the time interval or the number of pairs of signals intervening between a distinctive or "cardinal point" signal and the next pair of signals of equal individual intensity is noted, the direction of the signal source with respect to the receiving station can be ascertained.

In Fig. 2 aerials $a$, which are otherwise identical, are equally spaced around a common center $c$ from which they radiate They are connected in turn by means of a rotatable switch $r$ with a suitable energizing arrangement represented by a secondary coil $s$, primary $p$, spark gap $g$ and condenser $m$. The method of operation is substantially the same as for the arrangement of Fig. 1, distinctive signals being sent at definite positions of the switch and, apart from these distinctive signals, pairs of signals are sent from equally spaced aerials as the switch $r$ is caused to traverse the system, the preferred order in which the several aerials are brought into action to produce such pairs of signals being 1, 4; 2, 5; 3, 6; 4, 7; and so on around the circle. Otherwise stated, distinctive signals are sent at definite positions of the switch, e. g. at the position or positions corresponding with one or more cardinal points of the compass, and in addition signals are sent in pairs from equally spaced aerials with a minimum time interval between the individual signals of each pair. Thus when the aerials are brought into action in the order hereinbefore specified, a signal with the switch $r$ on aerial 1 would be followed immediately by a signal with the switch on aerial 4, and these would be followed in turn by signals from aerials 2 and 5, 3 and 6, and so on, a steady rate of progression of the switch $r$ from aerial 1 to aerials 2, 3, 4, etc., being maintained.

In the arangement of Fig. 3, two fixed aerials $a$, $a'$ set at an angle (preferably a right angle) to each other have in their circuits inductive coils $i$, $i'$ and tuning condensers $f$, $f'$ respectively, the coils $i$, $i'$ being arranged at the same angle to each other as the aerials $a$, $a'$. The aerials are energized in differential proportion by means of a rotatable inductive coil $a^0$ according to the angular relation of this coil with the coils $i$, $i'$ respectively. The coil $a^0$ with the tuning condenser $k$ is connected with any suitable source of electrical oscillations, as for example in the arrangement shown in the diagram.

If it should be unnecessary to radiate any considerable power the non-directable radiating systems of Fig. 3 may be dispensed with and a single directable coil such as $a^0$ used as the radiator of energy.

In both cases, in using the apparatus the coil $a^0$ is turned through a definite angle, say backward through 90°, between the individual signals of each pair; then forward through a definite angle, say 91°, for the first signal of the next pair and backward through 90° for the second signal thereof; and so on for each succeeding pair of signals, the distinctive or "cardinal point" signals being emitted as before at definite equally spaced points of the compass.

In the arrangement of Fig. 4 a rotatable or directable aerial $a$ and a fixed coil $d$, which is connected inductively through coil $q$ and variable inductance $h$ with a fixed or non-directable aerial $a'$, are connected in series in a circuit which also includes a tuning condenser $k$. A reversing switch $r$ interposed between the coils $a$ and $d$ operates automatically to reverse one of these coils with respect to the other at frequent intervals as the aerial $a$ is rotated and thereby causes the emission of signals in pairs of quickly succeeding individual signals at small time intervals in different directions. The radiating elements are energized by appropriate connection with any suitable source of electromagnetic oscillations, not shown in the diagram.

By noting at the receiving station the interval that has elapsed, either as measured by a stop watch or by the number of pairs of signals received between the reception of a pair of signals of equal individual strength and the distinctive signal immediately preceding or succeeding such pair of signals, the direction of the transmitting station from the receiving station can be ascertained.

This arrangement may be modified as shown in Fig. 5, to enable very considerably greater energy to be radiated by the introduction of two fixed radiating systems including aerials $a$, $a'$ set at right angles (preferably) to each other, inductive coils $i$, $i'$ set at same angle to each other as the aerials, and tuning condensers $f$, $f'$. These radiating circuits are energized inductively by a rotatable coil $a^0$, symmetrically arranged with respect to coils $i$, $i'$ and connected in series with a fixed coil $d$ which is inductively coupled with a non-directive aerial $a^2$. By means of switch $r$ the interconnection of the coils $a^0$, $d$ is reversed at short intervals as the coil $a^0$ is rotated continuously or step by step. A tuning condenser $k$ is included in the circuit of coils $a^0$, $d$ which is connected directly or inductively with a suitable electromagnetic wave generator not shown in the diagram. The method of operation is as described with reference to Fig. 4.

In the modified arrangement of Fig. 6, the two parts of the aerial $a$, $a'$ rotate at a fixed angle apart, preferably a right angle, about a common central vertical axis, a reverser $r$ automatically reversing their interconnection in the radiating circuit at short intervals as the coils are rotated unidirectionally. The circuit, which includes a tuning condenser $k$, is energized from any suitable source, as for example, inductively through coil $s$ from the oscillating circuit comprising spark gap $g$, condenser $m$ and primary coil $p$. The precise mechanism effecting and correlating the rotation of the coils $a$, $a'$, the operation of the switch $r$ and the sending of the pairs of signals is no essential part of the present invention, as the provision of such mechanism is well within the compass of any one skilled in the art. The coils $a$, $a'$ may, for example, be rotated step by step by mechanical means at a definite rate, the switch $r$ being reversed manually or automatically at each step and the sending key (not shown in the drawings) manually or automatically operated each time the switch $r$ is shifted. Or, instead of the coils $a$, $a'$ being rotated step by step they may be rotated continuously at a definite rate, the reversing switch and operating key being manually or automatically manipulated at definite angular positions of the coils. The individual signals of each pair of signals emitted are due to the radiation from the pair of coils before and after reversal respectively, and it will be obvious that when these are observed at the receiving station as being of equal strength, one of the coils is ineffective and, in the case of two coils at right angles to each other, will then be in a plane at right angles to the direction of propagation of the signal. Coupled with this observation, the information derived from the receipt of distinctive signals emitted by the aerial at definite points of the compass as the coils $a$, $a'$ are rotated, enables the direction of the transmitting station to be ascertained.

For higher power radiation the modification shown in Fig. 7 is used. This arrangement will readily be understood without further description. The aerials $a$, $a'$, secondary coils $b$, $b'$ and the rotatable inductive coils $a''$, $b''$ are set at the same angle with each other, preferably at right angles. The moving coils which are symmetrically placed with respect to the fixed coils will be referred to as the main coil and the auxiliary coil respectively, and the driving mechanism consists of means for rotating these coils at a uniform speed, or step by step, and means such as switch $r$ for reversing the connections of the auxiliary coil every degree or half degree, or as may be arranged.

The observer at the receiving station will hear a succession of signals in pairs, these pairs being usually of unequal intensity. When the individual signals of a pair are of equal strength, the maximum direction of propagation of the electromagnetic waves from the main coil is directly toward the observer. Assuming that the transmission system requires say two minutes for a rotation of 180°, and that distinguishing signals are sent out when the main coil is in a predetermined position, say due north and south, the observer will measure the time interval between such distinguishing signal and the next position of maximum radiation of the main coil. He can then immediately calculate his bearings from the beacon station.

The use of a stopwatch is assumed in this method, but if distinguishing signals are sent out on a sufficient number of predetermined directions, say every 10° around the compass, and the speed of rotation of the moving coils is low enough to enable the observer to appreciate each separate pair of signals then the observer by counting the number of pairs of signals received between a distinguishing signal and the next succeeding position of equality of signals, the bearing can be found without the use of a stopwatch. This, however, involves a somewhat low speed of rotation, and it is found that with a very considerably increased speed of rotation it is possible to arrange conditions so that when the individual signals of each pair of signals are of equal strength a pure note is heard, and when of unequal strength a series of harsh beats. With this method of using the apparatus a stopwatch is generally necessary to determine the time that elapses say from the north point distinguishing signal to the reception of the first pure note signal from that point.

It is to be noted that when two coils are used in the apparatus which has been hereinbefore described, signals will be of equal intensity when the main coil is pointing toward the receiving station, and also when the auxiliary coil is pointing in that direction. Thus, there will be four positions wherein signals are of equal intensity. The ambiguity thereby involved can, however, be annulled by arranging that the auxiliary coil should have a considerably greater total area than the main coil.

Having thus described the nature of the said invention and the best means we know of carrying the same into practical effect, we claim:—

1. The method of determining the bearing of a wireless transmitting station which consists in determining the interval between the reception of a distinctive signal periodically propagated from the transmitting station in a definite direction and the reception of a pair of successive signals of equal intensity in a series of signals propagated from the transmitting station in pairs of quickly succeeding individual signals at small equal time intervals, the individual signals of each pair varying in relative intensity in a given direction with the position of a movable element which controls the emission of signals at the transmitting station.

2. A wireless direction finding system comprising at the transmitting station means including a rotating element and a plurality of radiating systems for emitting at small equal time intervals signals in pairs of quickly succeeding individual signals in different directions from each other and also from the corresponding individual signals of the preceding pair of signals and of the succeeding pair, substantially as and for the purpose set forth.

3. In a wireless direction finding system, the combination of means at a transmitting station for periodically emitting distinctive signals in definite directions with means including a rotatable element and a plurality of radiating systems for emitting signals in pairs at small equal time intervals and for modifying the relative strength of the individual signals of each pair in a given direction, substantially as described.

4. In a wireless direction finding system, the combination of means at a transmitting station for periodically emitting distinctive signals in definite directions with means including a rotatable element and a plurality of radiating systems, one of which is the rotatable element, for emitting signals in pairs at small equal time intervals and for modifying the relative strength of the individual signals of each pair in a given direction, substantially as described.

5. In a wireless direction finding system the combination at a transmitting station of two wave producing circuits with a rotatable element controlling the direction of maximum strength of signals and means for reversing the inter-connection of the wave producing circuits, substantially as described.

In testimony whereof we have signed our names to this specification.

JAMES ERSKINE-MURRAY.
JAMES ROBINSON.